(12) United States Patent
Yu et al.

(10) Patent No.: US 6,621,946 B2
(45) Date of Patent: Sep. 16, 2003

(54) OPTICAL ISOLATOR

(75) Inventors: Tai-Cheng Yu, Tu-Chen (TW); Chun Yu Lee, Tu-Chen (TW); Ja Ju Dy, Tu-Chen (TW); Chien-Cheng Chen, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/962,046

(22) Filed: Sep. 21, 2001

(65) Prior Publication Data

US 2002/0186915 A1 Dec. 12, 2002

(30) Foreign Application Priority Data

Jun. 8, 2001 (TW) .................... 90209566 U

(51) Int. Cl.[7] .................. G02B 6/27; G02F 1/095
(52) U.S. Cl. .................. 385/11; 385/34
(58) Field of Search .................. 385/57, 70, 72–75, 385/91, 11, 50, 60, 34; 359/500

(56) References Cited

U.S. PATENT DOCUMENTS 5,734,762 A * 3/1998 Ho et al. .................. 385/11
6,048,103 A * 4/2000 Furukata et al. .................. 385/73
2001/0012422 A1 * 1/2001 Watanabe .................. 385/11

* cited by examiner

*Primary Examiner*—David V. Bruce
*Assistant Examiner*—Krystyna Suchecki
(74) *Attorney, Agent, or Firm*—Wei Te Chung

(57) ABSTRACT

An optical isolator includes a first optical collimator, an isolated core, a second optical collimator and an outer tube. The first and second collimators and the isolated core are accommodated in the outer tube. The second collimator has a long sleeve which entirely accommodates the isolated core. The isolated core includes a first polarizer, a Faraday rotator crystal, and a second polarizer positioned in sequence within a toroidal magnetic core. An axial length of the toroidal magnetic core is equal to or slightly less than an overall length of the two polarizers and the rotator crystal. The two polarizers and the rotator crystal are sized such that an overall diameter of the isolated core is less than an inner diameter of the long sleeve. The magnetic core is glued within the long sleeve.

14 Claims, 3 Drawing Sheets

OPTICAL ISOLATOR

BACKGROUND OF THE INVENTION

1. Field of the Invention

The present invention relates to optical isolators, and particularly to compact isolators having low insertion loss and low vulnerability to external environmental conditions.

2. Description of Prior Art

In present-day optical communications technology, optical signals are typically passed through a plurality of optical interfaces. All interfaces produce reflected signals. Reflected signals which return to a light source through a primary optical route cause the light source to become unstable and noisy. Optical isolators are used to block these reflected signals from reaching the light source. Ideally, optical isolators permit all light rays to move in a forward direction only, and block light rays from moving in a reverse direction.

As shown in FIG. 1, a conventional isolator 1 includes first and second optical collimators 10, an isolated center core 30 and an outer tube 40 enveloping the collimators 10 and the isolated center core 30. Each collimator 10 comprises a stainless steel tube 11, a sleeve 12, a ¼ pitch Graded Index (GRIN) lens 13, and a ferrule 14 which accommodates an optical fiber 15. The collimators 10 convert input optical signals into parallel rays, for providing sound coupling between two optical devices. The isolated center core 30 is stationed between the two collimators 10 and comprises a first polarizer 31, a Faraday rotator crystal 32, a second polarizer 33, and a toroidal magnetic core 34. The magnetic core 34 envelops the two polarizers 31, 33 and the Faraday rotator crystal 32 to protect them, and provides a magnetic field for the Faraday rotator 32.

Light signals pass in a forward direction from an end of the right-hand input fiber 15 to the right-hand Graded Index (GRIN) lens 13. The GRIN lens 13 collimates the light, and the collimated light from the GRIN lens 13 is then transmitted through the first polarizer 31. The first polarizer 31 is a birefringent crystal wedge. The first polarizer 31 separates incident light from the GRIN lens 13 into an ordinary ray polarized perpendicularly to an optical axis of the first polarizer 31, and an extraordinary ray polarized along the optical axis of the first polarizer 31.

Separation occurs because the birefringent crystal wedge has two indexes of refraction, one for the light polarized along the optical axis and another for the light polarized perpendicularly to the optical axis. The polarized light from the first polarizer 31 is then rotated 45° by the Faraday rotator 32. The Faraday rotator 32 is typically formed from garnet doped with impurities, or alternatively YIG, and is placed in the magnetic core 34.

The rotated light rays then enter the second polarizer 33, sometimes called an analyzer. Like the first polarizer 31, the second polarizer 33 typically is a birefringent crystal wedge. An optical axis of the birefringent crystal of the second polarizer 33 is oriented by 45° with respect to the optical axis of the birefringent crystal of the first polarizer 31. Thus the ordinary ray from the first polarizer 31 is also an ordinary ray of the second polarizer 33, and the extraordinary ray from the first polarizer 31 is also an extraordinary ray of the second polarizer 33. The result is that after having traveled from the first polarizer 31 through the second polarizer 33, the two polarized rays are recombined by the second polarizer 33. The two polarized rays are then refocused by the left-hand GRIN lens 13 to a point on an end of the left-hand fiber 15.

In the reverse direction, light from the left-hand fiber 15 is separated by the second polarizer 33 into two rays: an ordinary ray polarized perpendicularly to the optical axis of the second polarizer 33, and an extraordinary ray polarized along the optical axis of the second polarizer 33. When passing through the Faraday rotator 32, the light of both rays is rotated 45°. This rotation is nonreciprocal with the rotation of light in the forward direction. The ordinary ray from the second polarizer 33 is polarized along the optical axis of the first polarizer 31, and the extraordinary ray from the second polarizer 33 is polarized perpendicularly to the optical axis of the first polarizer 31. The ordinary and extraordinary rays from the second polarizer 33 have swapped places incident upon the first polarizer 31. Thus the light, having passed through the first polarizer 31, does not leave the polarizer 31 in parallel rays. The non-parallel light is focused by the right-hand GRIN lens 13 to a point not at the end of the input fiber 15. Thus, light traveling in the reverse direction is not passed back into the right-hand fiber 15.

The conventional optical isolator 1 has its isolated core 30 between the two collimators 10. The left-hand sleeve 12 is within the stainless steel tube 11. The left-hand GRIN lens 13 has a protruding end 131 protruding out of the sleeve 12 into the magnetic core 34. In assembly, the first polarizer 31, the rotator crystal 32 and the second polarizer 33 of the isolated core 30 are stationed within the magnetic core 34. End portions of the polarizers 31, 33 and the rotator crystal 32 are glued to an inner surface of the magnetic core 34. Then the protruding end 131 of the left-hand GRIN lens 13 is glued to the inner surface of the magnetic core 34. The isolated core 30 is thus securely connected with the left-hand collimator 10.

When the magnetic core 34 of the isolated core 30 is glued to the protruding end 131 of the left-hand GRIN lens 13, excess glue may contaminate the GRIN lens 13 and the adjacent surface of the adjacent second polarizer 33. Such contamination reduces the performance of the GRIN lens 13, and results in a large insertion loss of the isolator 1. In addition, such contamination on gelatine surfaces of the GRIN lens 13 and the second polarizer 33 is difficult to remove. Furthermore, the left-hand collimator 10 is fixedly connected with the isolated core 30. It is difficult to adjust the relative position of the collimator 10 and the isolated core 30, so as to accurately focus output light on the end of the left-hand fiber 15. Moreover, the components of the isolator 1 are unduly large. This adds to costs, particularly the cost of the isolated core 30. Finally, the isolated core 30 is located outside the two sleeves 12. Thus the isolated core 30 is vulnerable to changes in temperature of the external environment, which may adversely affect the operation of the isolator 1.

Accordingly, an improved isolator is needed to overcome the many disadvantages of conventional isolators.

SUMMARY OF THE INVENTION

Accordingly, one object of the present invention is to provide an optical isolator with low insertion loss and low cost.

Another object of the present invention is to provide an optical isolator which is less vulnerable to changes in its surrounding environment.

A further object of the present invention is to provide an optical isolator which has no contamination caused by excess glue, and which has an isolated core which is effectively insulated from external contaminants both during and after assembly.

To solve the problems of the prior art and achieve the objects set out above, an optical isolator of the present invention comprises a first optical collimator, an isolated core, a second optical collimator and an outer tube. The second collimator has a long sleeve which entirely accommodates the isolated core. The isolated core comprises a first polarizer, a Faraday rotator crystal and a second polarizer stationed in sequence within a toroidal magnetic core. An axial length of the toroidal magnetic core is equal to or slightly less than an overall length of the two polarizers and the rotator crystal. The two polarizers and the rotator crystal are sized such that an overall diameter of the isolated core is less than an inner diameter of the sleeve of the second collimator.

In assembly, a GRIN lens, a ferrule and an optical fiber are fixedly received in the sleeve. The isolated core comprising the toroidal magnetic core, the polarizers and the rotator crystal is glued to an inside of an end of the sleeve. Before the glue cures, the position of the isolated core is adjusted so that the relative positions of the isolated core and the GRIN lens yield optimized optical characteristics. Then, the first collimator and the second collimator incorporating the isolated core are mounted in the outer tube. The relative positions of the first and second collimators are adjusted to obtain optimized optical characteristics for the isolator. Finally, encapsulation is applied to opposite ends of the outer tube to fix the collimators to the outer tube and thereby complete assembly of the isolator.

Other objects, advantages and novel features of the invention will become more apparent from the following detailed description when taken in conjunction with the accompanying drawings.

DETAILED DESCRIPTION OF THE INVENTION

Figure 1:
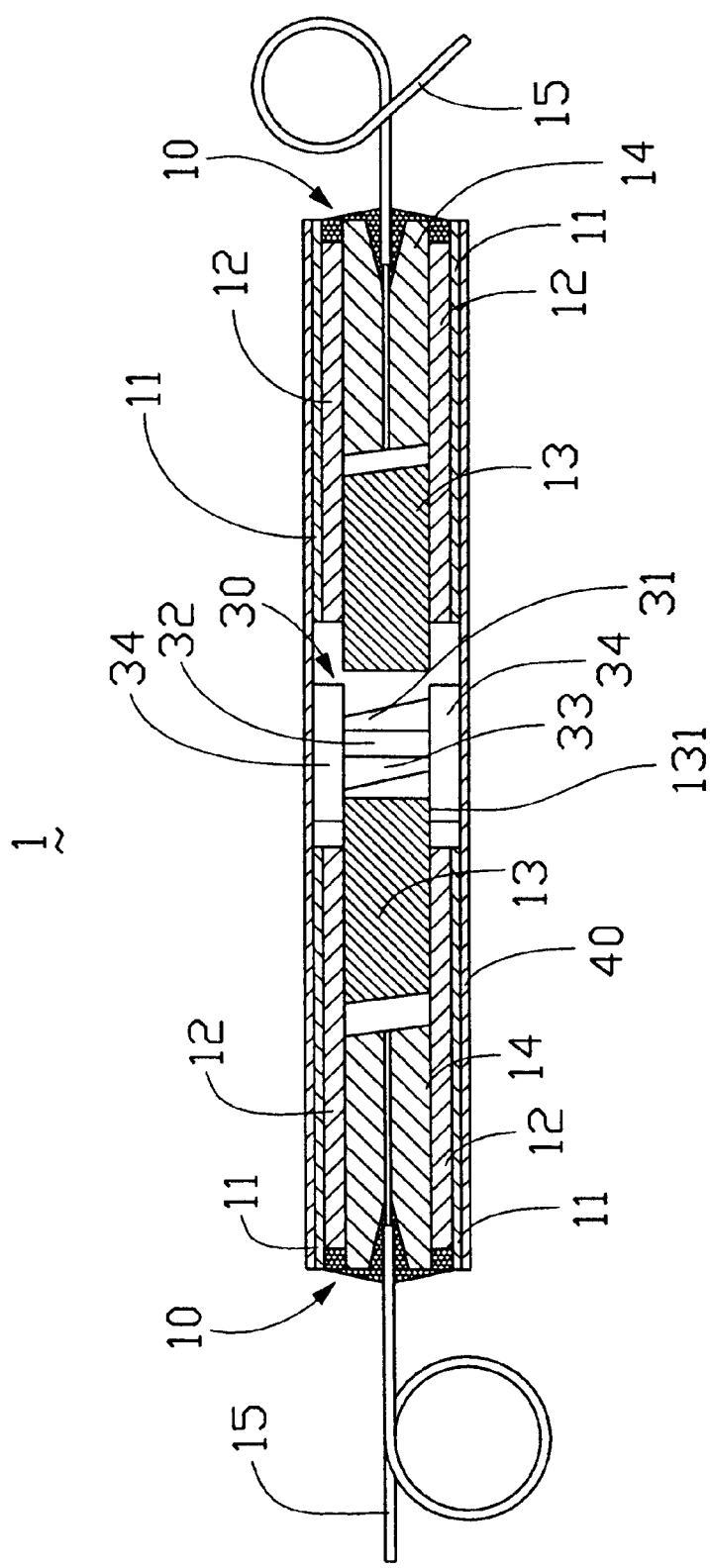
FIG. 1 is a schematic cross-sectional view of a conventional optical isolator.

For facilitating understanding, like components are designated by like reference numerals throughout the various embodiments of the invention as shown in the various drawing figures.

Reference will now be made to the drawing figures to describe the present invention in detail.

Figure 2:
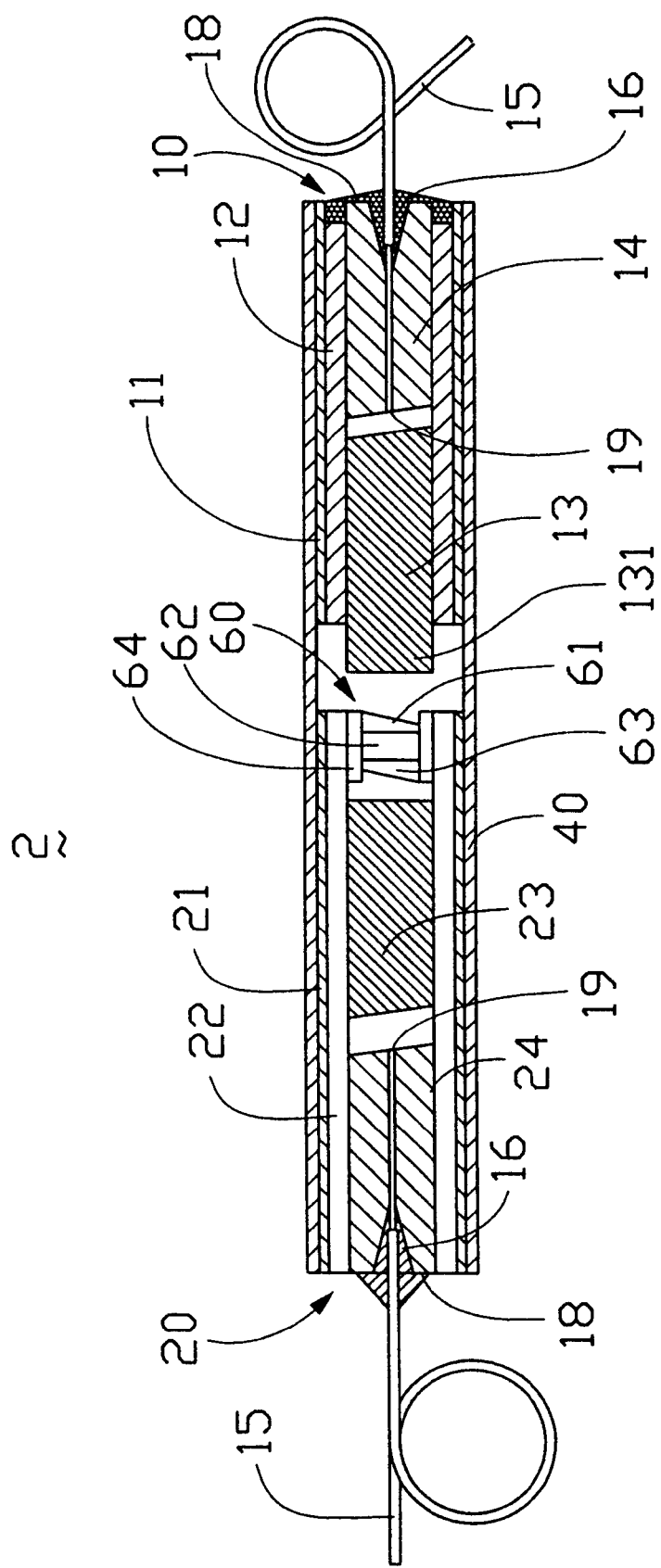
FIG. 2 is a schematic cross-sectional view of an optical isolator in accordance with a preferred embodiment of the present invention.

Referring to FIG. 2, an optical isolator 2 in accordance with a preferred embodiment of the present invention comprises a first optical collimator 10, a second optical collimator 20, an isolated core 60 and an outer tube 40 securing the first and second optical collimators 10, 20 and the isolated core 60 together.

The first collimator 10 comprises a first ferrule 14, a first GRIN lens 13, a first sleeve 12 and a first stainless steel tube 11. The first ferrule 14 has a first end 18, a second end 19 polished to an angle of 8 degrees relative to a cross-sectional axis of the isolator 2, and a central hole 16 defined between the first and second ends 18, 19. The ferrule 14 forms an inner annular chamfer at the first end 18, for facilitating insertion of an optical fiber 15 therein. An inner end surface of the optical fiber 15 is polished to be coplanar with the end surface of the second end 19 of the first ferrule 14. The coplanar inner end surface of the optical fiber 15 and the second end 19 have an antireflection film coated thereon. The first sleeve 12 is a glass tube in the preferred embodiment, and accommodates the first ferrule 14 and the first GRIN lens 13 therein. The first sleeve 12 has a length such that an inner end 131 of the first GRIN lens 13 opposite to the isolated core 60 protrudes out of the first sleeve 12.

The second collimator 20 is similar to the first collimator 10. The second collimator 20 comprises a second ferrule 24, a second GRIN lens 23 and a second sleeve 22 which is within a second stainless steel tube 21. The second sleeve 22 of the second collimator 20 is longer than the first sleeve 12 of the first collimator 10. The second sleeve 22 completely surrounds the second GRIN lens 23. The second sleeve 22 extends a distance beyond the second GRIN lens 23, for receiving the isolated core 60 therein.

The isolated core 60 is positioned within the second sleeve 22 between the first and the second collimators 10, 20. The isolated core 60 comprises a first polarizer 61, a rotator crystal 62 and a second polarizer 63 positioned in that sequence from the first collimator 10 to the second collimator 20. A toroidal magnetic core 64 surrounds the first and second polarizers 61, 63 and the rotator crystal 62. Each first and second polarizer 61, 63 is made of lithium niobate ($LiNbO_3$) birefringent crystal in the preferred embodiment. In the optical isolator 2, the optical axis of the second birefringent crystal 63 is oriented at an angle of 45° with respect to the optical axis of the first birefringent crystal 61. The rotator crystal 62 typically is a Faraday rotator rotating an input light by 45°. An axial length of the magnetic core 64 is equal to or slightly less than an overall length of the two polarizers 61, 63 and the rotator crystal 62. An outside diameter of the magnetic core 64 is slightly less than an internal diameter of the second sleeve 22, so that the magnetic core 64 can be freely slid in the second sleeve 22 to facilitate optical adjustment of the isolator 2. An axial length of the isolated core 60 is less than the distance by which the second sleeve 22 extends beyond the second GRIN lens 23.

In assembly, the second GRIN lens 23 and the second ferrule 24 together with the optical fiber 15 are fixedly received in the second sleeve 22 which is then secured within the second stainless steel tube 21. The isolated core 60 is glued to an inside of an end of the second sleeve 22. Before the glue cures, the position of the isolated core 60 is adjusted so that the relative positions of the isolated core 60 and the two GRIN lenses 13, 23 yield optimized optical characteristics. The first and second collimators 10, 20 together with the isolated core 60 are then mounted in the outer tube 40. The relative positions of the first and second collimators 10, 20 are adjusted to obtain optimized optical characteristics for the isolator 2. Finally, encapsulation is applied to opposite ends of the outer tube 40 to fix the first and second collimators 10, 20 to the outer tube 40. Assembly of the isolator 2 is thus completed.

In the present invention, when the isolated core 60 is glued to the magnetic core 64, any excess glue only contaminates the magnetic core 64. Thus the optical characteristics of the isolator 2 are still preserved. In addition, compared to prior art, the relative positions of the second collimator 20 and the isolated core 60 are more easily adjusted to obtain optimized optical characteristics. Furthermore, the sizes of the magnetic core 64, the first and second polarizers 61, 63 and the rotator crystal 62 are reduced in comparison to prior art. This reduces the overall cost of the isolator 2. Finally, the isolated core 60 is located completely within the second sleeve 22. Thus the isolated core 60 is insulated from changes in temperature of the external environment which might otherwise adversely affect the operation of the isolator 2.

Figure 3:
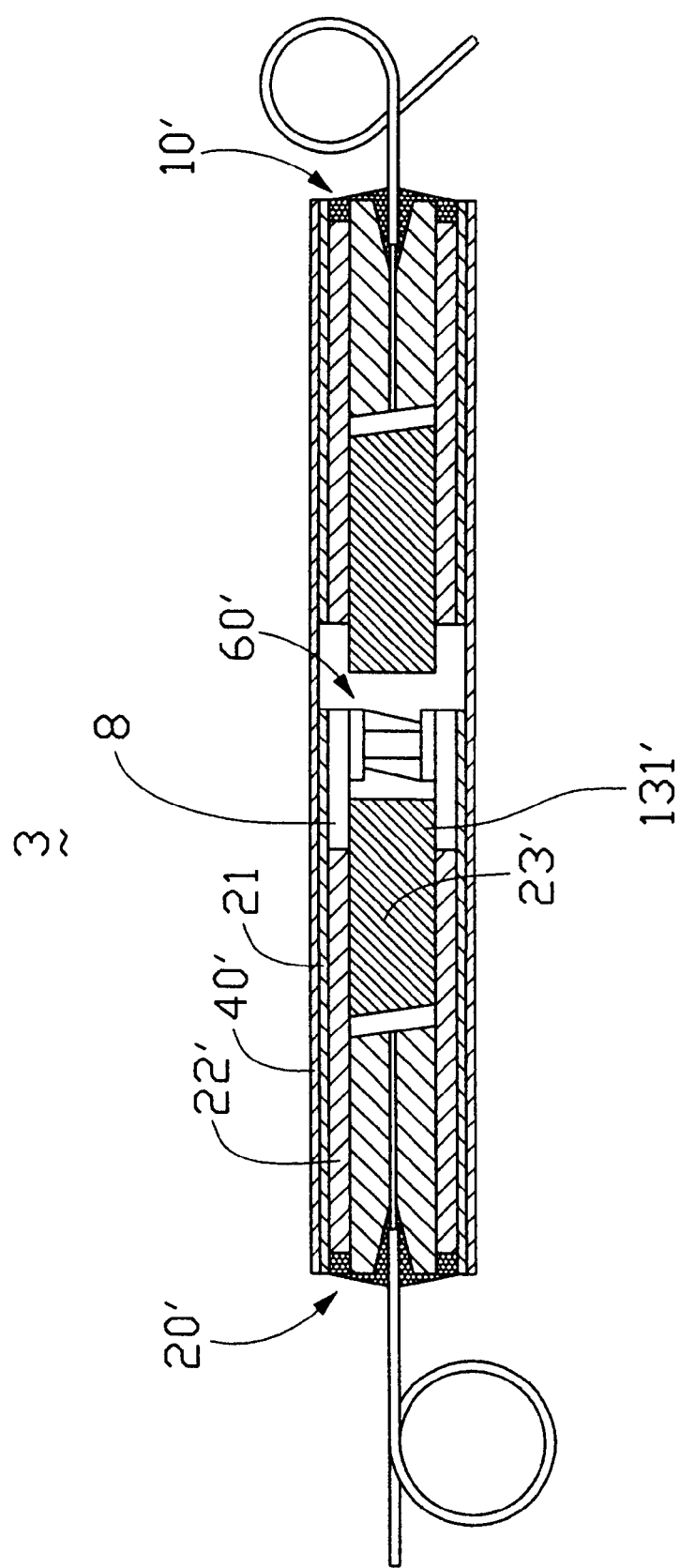
FIG. 3 is a schematic cross-sectional view of an optical isolator in accordance with an alternative embodiment of the present invention.

FIG. 3 shows an optical isolator 3 in accordance with an alternative embodiment of the present invention. The isolator 3 comprises first and second optical collimators 10', 20', and an isolated core 60'. A right half-portion of the isolator 3 is substantially the same as a right half-portion of the isolator 2 of the preferred embodiment. Therefore, only a left half-portion of the isolator 3 is described herein. The isolator 3 has a central tube 8 stationed between the first and second collimators 10', 20'. The central tube 8 typically is made of glass. A GRIN lens 23' has a protruding end 131' protruding out from a sleeve 22' which is within a stainless tube 21. The central tube 8 is glued to the protruding end 131'. The isolated core 60' is inserted into the central tube 8. In assembly, excess glue from the process of gluing the central tube 8 to the GRIN lens 23' is removed. Then the isolated core 60' is inserted into the central tube 8 and glued thereto. Before the glue cures, the isolated core 60' is slid relative to the GRIN lens 23' to obtain optimized optical characteristics. The first and second collimators 10', 20', the central tube 8 and the isolated core 60' are mounted in an outer tube 40'. The central tube 8 receives a part of the GRIN lens 23' which protrudes beyond the sleeve 22'. The relative positions of the first and second collimators 10', 20' are adjusted to obtain optimized optical characteristics for the isolator 3. Finally, encapsulation is applied to opposite ends of the outer tube 40', to fix the collimators 10', 20' to the outer tube 40'. Assembly of the isolator 3 is thus completed.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An optical isolator comprising:
   a first optical collimator including a first ferrule, a first lens and a first sleeve securing the first ferrule and the first lens;
   a second optical collimator including a second ferrule, a second lens and a second sleeve securing the second ferrule and the second lens, the second sleeve extending beyond the second lens a distance toward the first collimator; and
   an isolated core mounted within the second sleeve of the second collimator generally opposite the first collimator, the isolated core including a first polarizer, a rotator crystal and a second polarizer stationed in sequence within a toroidal magnetic core, the magnetic core being glued to the second sleeve.

2. The optical isolator as described in claim 1, wherein the magnetic core has a length which is equal to or less than an overall length of the first and second polarizers and the rotator crystal.

3. The optical isolator as described in claim 2, wherein an end portion of the first lens in the first collimator protrudes out of the first sleeve generally opposite the isolated core.

4. The optical isolator as described in claim 1, wherein the first and second lenses in the first and second collimators are Graded Index lenses.

5. The optical isolator as described in claim 1, wherein the first and second polarizers are birefringent crystals, and the rotator crystal is a Faraday rotator.

6. The optical isolator as described in claim 1, wherein the distance by which the second sleeve extends beyond the second lens is greater than a length of the isolated core.

7. An optical isolator comprising:
   an outer tube;
   two collimators mounted in opposite ends of the outer tube; and
   an isolated central core mounted in the outer tube between the collimators;
   wherein each of the collimators in sequence from a corresponding end of the outer tube toward a center of the outer tube includes a ferrule, a Graded Index lens, and an optical fiber extending into the ferrule, and wherein a pair of sleeves is located in the outer tube and receives the corresponding collimators therein, a central tube is located in the outer tube and receives the isolated core therein, the isolated core includes a toroidal magnetic core, and a first polarizer, a rotator crystal and a second polarizer received in sequence in the magnetic core, the isolated core is fixed to one sleeve by the magnetic core being glued to the central tube, and an internal diameter of the central tube is equal to or slightly less than an internal diameter of the said one sleeve.

8. The optical isolator as described in claim 7, further comprising a stainless steel tube enclosing the sleeves.

9. The optical isolator as described in claim 7, wherein the rotator crystal is a Faraday rotator crystal.

10. The optical isolator as described in claim 7, wherein the central tube also receives a part of the Graded Index lens of the collimator received in the said one sleeve.

11. The optical isolator as described in claim 7, wherein an axial length of the magnetic core is equal to or slightly less than an overall length of the first and second polarizers and the rotator crystal.

12. An optical isolator comprising:
    an outer tube;
    two collimators received within two opposite portions of the outer tube;
    each of said two collimators including a ferrule with an optical fiber therein and a GRIN lens commonly received within a sleeve;
    an isolated core attached to one of said two collimators in said outer tube, said isolated core including two polarizers sandwiching a rotator crystal therebetween and commonly enclosed in a magnetic core; wherein
    a diametrical dimension of said isolated core is not larger than an inner diameter of the corresponding sleeve of said one of the two collimators; and
    said corresponding sleeve of said one of the two collimators extends beyond the corresponding GRIN lens and further encloses said isolated core therein.

13. The isolator as described in claim 12, wherein a central tube with the same inner diameter with said corresponding sleeve of said one of the two collimators encloses said isolated core therein.

14. The isolator as described in claim 13, wherein said central tube is axially attached to said corresponding sleeve of said one of the two collimators.

* * * * *